(12) United States Patent
Trewella et al.

(10) Patent No.: US 8,636,888 B2
(45) Date of Patent: Jan. 28, 2014

(54) PROCESS FOR IMPROVING THE SEPARATION OF OIL/WATER MIXTURES

(75) Inventors: Jeffrey C. Trewella, Kennett Square, PA (US); Royce Roemisch, Houston, TX (US)

(73) Assignee: KIOR, Inc., Pasadena, TX (US)

( * ) Notice: Subject to any disclaimer, the term of this patent is extended or adjusted under 35 U.S.C. 154(b) by 183 days.

(21) Appl. No.: 13/212,888

(22) Filed: Aug. 18, 2011

(65) Prior Publication Data

US 2013/0043134 A1   Feb. 21, 2013

(51) Int. Cl.
*B01D 17/06* (2006.01)

(52) U.S. Cl.
USPC .......................................... 204/567

(58) Field of Classification Search
USPC ............................ 204/168, 172, 567; 210/708
See application file for complete search history.

(56) References Cited

U.S. PATENT DOCUMENTS

| | | | |
|---|---|---|---|
| 4,147,593 A | 4/1979 | Frischmuth et al. | |
| 4,304,649 A | 12/1981 | Han et al. | |
| 4,942,269 A | 7/1990 | Chum et al. | |
| 5,395,455 A | 3/1995 | Scott et al. | |
| 5,792,340 A | 8/1998 | Freel et al. | |
| 5,877,380 A | 3/1999 | Conroy et al. | |
| 6,814,940 B1 | 11/2004 | Hiltunen et al. | |
| 6,830,597 B1 | 12/2004 | Green | |
| 7,004,999 B2 | 2/2006 | Johnson et al. | |
| 7,319,168 B2 | 1/2008 | Sanada | |
| 2003/0207407 A1 | 11/2003 | Buchanan et al. | |
| 2007/0007188 A1 | 1/2007 | Skrypski-Mantele et al. | |
| 2008/0006520 A1 | 1/2008 | Badger et al. | |
| 2008/0264771 A1 | 10/2008 | Dam-Johansen et al. | |
| 2009/0007484 A1 | 1/2009 | Smith | |
| 2009/0054711 A1 | 2/2009 | Lawrence et al. | |
| 2009/0119979 A1 | 5/2009 | Mullen | |
| 2009/0139851 A1 | 6/2009 | Freel | |
| 2009/0151233 A1 | 6/2009 | Miller | |
| 2009/0165378 A1 | 7/2009 | Agblevor | |
| 2010/0076238 A1 | 3/2010 | Brandvold et al. | |
| 2010/0083566 A1 | 4/2010 | Fredriksen et al. | |
| 2010/0162625 A1 | 7/2010 | Mills | |
| 2011/0146140 A1 | 6/2011 | Brandvold et al. | |
| 2011/0245489 A1 | 10/2011 | Steele et al. | |

FOREIGN PATENT DOCUMENTS

| | | |
|---|---|---|
| EP | 0718392 | 6/1996 |
| WO | WO2009130392 | 10/2009 |

OTHER PUBLICATIONS

Adjaye, et al.; Production of hydrocarbons by catalytic upgrading of a fast pyrolysis bio-oil. Part 1: Conversion over various catalysts; Fuel Processing Technology, vol. 45, Apr. 6, 1995, pp. 161-183.

Adjaye, et al.; Production of hydrocarbons by catalytic upgrading of a fast pyrolysis bio-oil. Part II: Comparative catalyst performance and reaction pathways; Fuel Processing Technology, vol. 45, Apr. 4, 1995; pates 185-202.

Gerdes, et al.; Alternatives from Wood and Cellulose, Precoat Filtration with Organic Filter Aids; JRS Filtration & Separation; Dec. 1997; 6 pages; vol. 34, No. 10, ISSN 0015-1882.

Maximize Biodiesel Yields by Using Celite Filter Aids, Filtration, Dewatering, Dewaxing, and Winterization; World Minerals Americas and World Headquarters; 2009; 4 pages; Santa Barbara, California.

Qi, et al.; Review of biomass pyrolysis oil properties and upgrading research; Energy Conversion and Management 48 (2007); 87-92, Jun. 22, 2006.

Elliott, et al.; Liquid Fuels by Low-Severity Hydrotreating of Biocrude, Developments in Thermochemical Biomass Conversion; vol. 1, pp. 611-621, A.V. Bridgewater and DGB Boocock, Blackie Academic & Professional, Longon: 1996.

Diebold et al.; Additives to Lower and Stabilize the Viscosity of Pyrolysis Oils during Storage; Energy fuels, 1997, 11 (5); pp. 1081-1091; Sep. 18, 1997.

International Application No. PCT/US12/050552; International Search Report; dated Feb. 26, 2013; 6 pages.

*Primary Examiner* — Kishor Mayekar

(74) *Attorney, Agent, or Firm* — Dunlap Codding, P.C.

(57) ABSTRACT

Disclosed is a process for the reduction of the electrical conductivity of a product mixture containing the oil and water phases resulting from the conversion of biomass to liquid products, including the at least partial breaking of any oil/water emulsion, which aids in the separation of the oil and water phases.

23 Claims, No Drawings

PROCESS FOR IMPROVING THE SEPARATION OF OIL/WATER MIXTURES

BACKGROUND OF THE INVENTION

1. Field of the Invention

The invention relates generally to the reduction of the electrical conductivity of the oil and water phases resulting from the conversion of biomass to liquid products, and more particularly to an effective means to at least partially break any oil/water emulsions between the two phases.

2. Description of the Related Art

In the conversion of biomass to liquid products, the product stream can contain both an oil phase and a water phase (containing both water present in the biomass prior to conversion, and water produced during the conversion process). Pyrolysis, in particular flash pyrolysis, has been proposed as one such process for converting solid biomass material to liquid products. Pyrolysis in general refers to a process in which a feedstock is heated in an oxygen-poor or oxygen-free atmosphere. If solid biomass is used as the feedstock of a pyrolysis process, the process produces gaseous, liquid, and solid products. It is often the case that a rag layer or "emulsion" is formed between the oil phase and the water phase, or that all or a substantial portion of the oil and water in the liquid product are in the form of an emulsion, which, in either case, can be difficult to break, and results in increased expense in oil and water separation (whether through centrifugation, coalescing filtration, etc).

Thus, there is a need for an improved system whereby the oil and water components are more easily separated.

BRIEF SUMMARY OF THE INVENTION

In accordance with an embodiment of the present invention, a process is provided comprising:

a) providing a first mixture including an oil phase comprising biomass derived carbon containing compounds and an aqueous phase comprising water; and b) adding a quantity of a conductivity modifier to the first mixture thereby forming a second mixture, wherein the quantity of the conductivity modifier is sufficient such that the electrical conductivity of the second mixture is lower than the electrical conductivity of the first mixture.

In accordance with another embodiment of the present invention, wherein at least a portion of the first mixture is in the form of an emulsion comprising at least a portion of the biomass derived carbon containing compounds and at least a portion of the water, a process is provided comprising:

subjecting the second mixture to electrostatic dehydration, resulting in at least a partial breaking of the emulsion.

DETAILED DESCRIPTION OF THE INVENTION

The biomass material useful in the current invention can be any biomass capable of being converted to liquid and gaseous hydrocarbons.

Preferred are solid biomass materials comprising a cellulosic material, in particular lignocellulosic materials, because of the abundant availability of such materials, and their low cost. The solid biomass feed can comprise components selected from the group consisting of lignin, cellulose, hemicelluloses, and combinations thereof. Examples of suitable solid biomass materials include forestry wastes, such as wood chips and saw dust; agricultural waste, such as straw, corn stover, sugar cane bagasse, municipal waste, in particular yard waste, paper, and card board; energy crops such as switch grass, coppice, eucalyptus; and aquatic materials such as algae; and the like.

The biomass can be converted, by any suitable means, to reaction products comprising, at least in part, a first mixture comprising an oil phase comprising, consisting of, or consisting essentially of biomass derived carbon containing compounds and an aqueous phase comprising, consisting of, or consisting essentially of water. The biomass conversion can be by a method including, but not limited to, fast pyrolysis, catalytic pyrolysis, and hydrothermal conversion, each at elevated temperatures. The temperatures can range from 300 to 1000 C, or 400 to 700 C. The first mixture can have a Total Acid Number (TAN) of at least about 2, or at least about 3, or at least about 10, or at least about 20, or at least about 30.

The biomass feed can be charged to a reaction zone along with a heat carrier material and/or a catalyst for mixture with the biomass feed and to transfer heat thereto. Useful catalysts for this process include those containing catalytic acidity and preferably containing zeolite. The biomass feed can be converted to reaction products comprising, consisting of, or consisting essentially of: the first mixture described above, and optionally light gases and/or char. The reaction products can be removed from the reaction zone and the first mixture condensed therefrom. The first mixture can also comprise, consist of, or consist essentially of an oil phase comprising, consisting of, or consisting essentially of biomass derived carbon containing compounds, and an aqueous phase comprising, consisting of, or consisting essentially of water, and solids.

A quantity of a conductivity modifier can be added to the first mixture thereby forming a second mixture, wherein the quantity of the conductivity modifier is sufficient such that the electrical conductivity of the second mixture is lower than the electrical conductivity of the first mixture. The first mixture can have an electrical conductivity of at least about 900,000, or at least about 950,000 nano Siemens per meter (nS/m); and the second mixture preferably has an electrical conductivity less than about 800,000 or less than about 500,000 nS/m. In one embodiment, the conductivity modifier can have a TAN lower than the TAN of the first mixture, and preferably has a TAN at least about 2 units lower than the TAN of the first mixture. The electrical conductivity of the second mixture is preferably less than about 75%, more preferably less than about 50%, and even more preferably less than about 25% of the electrical conductivity of the first mixture.

The conductivity modifier can be selected from the group consisting of an aqueous solution, a fraction separated from the biomass derived carbon containing compounds, a fraction separated from the biomass derived carbon containing compounds following hydrotreatment of the biomass derived carbon containing compounds, and combinations thereof. The conductivity modifier can comprise an aqueous solution having a pH greater than 7 or greater than about 9. The aqueous solution can comprise a base selected from the group consisting of NaOH, KOH, $NH_4OH$, alkyl amines, pyridines, quinolines, ammonia, ammonium compounds including: nitrates, sulfides, carbonates (such as ammonium bicarbonate), hydroxides, acetates, chlorides, bromides, iodides, and sulfates, and combinations thereof, and is preferably ammonium bicarbonate or ammonium hydroxide or a combination thereof. Combinations of bases can be added separately or simultaneously as a pre-mixed solution. If added separately, they can be added at different process conditions including different temperature and different pressures. Buffers may also be used to more tightly control pH.

In addition, at least a portion of the first mixture and/or the resulting second mixture can be in the form of an emulsion comprising a portion of the biomass derived carbon containing compounds and a portion of the water. The second mixture, including the conductivity modifier described above, can be subjected to electrostatic dehydration, resulting in at least a partial breaking of the emulsion, and freeing from the emulsion at least 75%, or at least 90%, or at least 95% of the biomass derived carbon containing compounds contained in the emulsion or at least 50%, or at least 70%, or at least 95% of the water contained in the emulsion. Also, the second mixture, following electrostatic dehydration, preferably has an electrical conductivity less than about 250,000 nS/m. The electrostatic dehydration is preferably performed in a desalter vessel. Also, a demulsifier compound can be added to the first mixture, along with the conductivity modifier, thereby forming the second mixture which is then subjected to the electrostatic dehydration. The demulsifier can be an alkoxylate derived from a poly amine.

The following example is provided to further illustrate this invention and is not to be considered as unduly limiting the scope of this invention.

EXAMPLE

Raw bio-oil was separated from a product mixture produced from the thermo-catalytic pyrolysis of southern yellow pine wood chips. The raw bio-oil had a TAN of 6.1; 3.2 vol % water (determined by the Karl Fischer titration method); and 5,000 ppm solids. A quantity of the raw bio-oil was blended with a quantity a bio-naphtha fraction separated from the raw bio-oil by distillation to form a 50/50 blend (by volume). The 50/50 blend contained about 4.0 wt % BS&W (basic sediment and water). A quantity of the 50/50 blend was centrifuged, removing a major portion of the free water and solids, amounting to about 3 wt %, resulting in a centrifuged blend containing about 1.0 wt % BS&W. A quantity of the centrifuged blend was then neutralized with a 3 wt NaOH aqueous solution to reduce the TAN to about 0 (no TAN measurable). For maximum dehydration, the neutralized blend was also treated at 2.5 kV/inch AC electricity following addition of 100 ppm of a demulsifier obtained from Croda, commercially available under the trade name Croda D510. The resulting neutralized blend contained about 0 wt % (trace) BS&W. Each of the 50/50 blend, the centrifuged blend, and the neutralized blend were tested for conductivity at various temperatures. Results of such tests are shown in the Table below.

|  | "As Is" 50/50 Blend | Centrifuged Blend | Neutralized and Electrostatically Dehydrated Blend |
| --- | --- | --- | --- |
| BS&W | ~4% | ~1% | ~0% |
| Temp. (F.) | Specific Conductivity (nS/m) | | |
| 80 | 1,150,000 | 296,667 | — |
| 90 | — | — | 67,333 |
| 120 | | 373,333 | 88,667 |
| 160 | | 502,000 | 120,667 |
| 200 | | 590,000 | 139,333 |
| 240 | | 702,667 | 140,667 |
| 280 | | 826,667 | 133,333 |

As can be seen from the data in the Table, the addition of a neutralizing base to the bio-oil/bio-naphtha blend, along with electrostatic dehydration, results in a significant decrease in conductivity. Thus, rather than leading to an expected increase in conductivity, it was unexpectedly found that the addition of a base to the system actually reduced the conductivity.

While the technology has been particularly shown and described with reference to specific embodiments, it should be understood by those skilled in the art that various changes in form and detail may be made without departing from the spirit and scope of the technology as defined by the appended claims.

That which is claimed is:

1. A method comprising:
   a) providing a first mixture in the form of a first emulsion of biomass derived carbon containing compounds and water;
   b) adding a quantity of a conductivity modifier to said first mixture thereby forming a second mixture in the form of a second emulsion of said biomass derived carbon containing compounds and said water and said conductivity modifier, and wherein said quantity of said conductivity modifier is sufficient such that the electrical conductivity of said second mixture is lower than the electrical conductivity of said first mixture; and
   c) subjecting said second mixture to electrostatic dehydration, resulting in at least a partial breaking of said second emulsion, and freeing and separating from said second emulsion at least 75% of said biomass derived carbon containing compounds contained in said second emulsion.

2. The method of claim 1 wherein said first mixture is produced from the catalytic conversion of biomass at elevated temperatures.

3. The method of claim 1 wherein said first mixture has a Total Acid Number greater than 0, and wherein said conductivity modifier has a Total Acid Number less than the Total Acid Number of said first mixture.

4. The method of claim 1 wherein said first mixture has a Total Acid Number of at least about 2.

5. The method of claim 1 wherein said first mixture has a Total Acid Number of at least about 3.

6. The method of claim 1 wherein said first mixture has a Total Acid Number of at least about 10.

7. The method of claim 1 wherein the Total Acid Number of said conductivity modifier is at least about 2 units lower than the Total Acid Number of said first mixture.

8. The method of claim 1 wherein the electrical conductivity of said second mixture is less than about 75% of the electrical conductivity of said first mixture.

9. The method of claim 1 wherein the electrical conductivity of said second mixture is less than about 50% of the electrical conductivity of said first mixture.

10. The method of claim 1 wherein the electrical conductivity of said second mixture is less than about 25% of the electrical conductivity of said first mixture.

11. The method of claim 1 wherein said conductivity modifier is selected from the group consisting of an aqueous solution, a fraction separated from said biomass derived carbon containing compounds, a fraction separated from said biomass derived carbon containing compounds following hydrotreatment of said biomass derived carbon containing compounds, and combinations thereof.

12. The method of claim 11 wherein said conductivity modifier comprises an aqueous solution having a pH greater than 7.

13. The method of claim 12 wherein said aqueous solution comprises a base selected from the group consisting of NaOH, KOH, NH$_4$OH, alkyl amines, pyridines, quinolines, ammonia, ammonium compounds including: nitrates, sulfides, carbonates, hydroxides, acetates, chlorides, bromides, iodides, and sulfates, and combinations thereof.

14. The method of claim 13 wherein said base is selected from the group consisting of ammonium bicarbonate, ammonium hydroxide or combinations thereof.

15. The method of claim 11 wherein said conductivity modifier comprises an aqueous solution having a pH greater than about 9.

16. The method of claim 1 wherein at least 90% of said biomass derived carbon containing compounds contained in said second emulsion are freed and separated from said second emulsion in step c).

17. The method of claim 1 wherein at least 95% of said biomass derived carbon containing compounds contained in said second emulsion are freed and separated from said second emulsion in step c).

18. The method of claim 1 wherein at least 50% of said water contained in said second emulsion is freed from said second emulsion in step c).

19. The method of claim 1 wherein at least 70% of said water contained in said second emulsion is freed from said second emulsion in step c).

20. The method of claim 1 wherein at least 95% of said water contained in said second emulsion is freed from said second emulsion in step c).

21. The method of claim 1 wherein said electrostatic dehydration is performed in a desalter vessel.

22. The method of claim 1 wherein a demulsifier compound is added to said first mixture, along with said conductivity modifier, thereby forming said second mixture which is then subjected to said electrostatic dehydration.

23. The method of claim 22 wherein said demulsifier is an alkoxylate derived from a poly amine.

* * * * *

UNITED STATES PATENT AND TRADEMARK OFFICE
CERTIFICATE OF CORRECTION

PATENT NO. : 8,636,888 B2  Page 1 of 1
APPLICATION NO. : 13/212888
DATED : January 28, 2014
INVENTOR(S) : Jeffrey C. Trewella and Royce Roemisch It is certified that error appears in the above-identified patent and that said Letters Patent is hereby corrected as shown below:

In the Specification:
Column 3, line 39: After "3 wt" insert -- % --

Signed and Sealed this
Twentieth Day of May, 2014

Michelle K. Lee
*Deputy Director of the United States Patent and Trademark Office*